United States Patent [19]

Rossbach et al.

[11] Patent Number: 4,975,495

[45] Date of Patent: Dec. 4, 1990

[54] METHOD FOR THE MODIFICATION OF THE SURFACES OF POLYTETRAFLUOROETHYLENE, MODIFIED MOLDED ELEMENTS BASED ON POLYTETRAFLUOROETHYLENE, AND USE OF THE SAME

[75] Inventors: Volker Rossbach, Roonstr. 24, D-2000 Hamburg 20; Mihal Karunaratna, Krefeld; Heinz Nottelmann, Hamburg; Johannes Windeln, Bodenheim, all of Fed. Rep. of Germany

[73] Assignee: Volker Rossbach, Hamburg, Fed. Rep. of Germany

[21] Appl. No.: 42,948

[22] PCT Filed: Aug. 5, 1986

[86] PCT No.: PCT/EP86/00462

§ 371 Date: May 29, 1987

§ 102(e) Date: May 29, 1987

[87] PCT Pub. No.: WO87/00847

PCT Pub. Date: Feb. 12, 1987

[30] Foreign Application Priority Data

Aug. 6, 1985 [DE] Fed. Rep. of Germany ....... 3528181

[51] Int. Cl.$^5$ ................................................ C08F 8/42

[52] U.S. Cl. .................................... 525/340; 525/326.4; 525/342; 525/360; 525/367; 525/371; 525/383

[58] Field of Search ................ 525/371, 360, 340, 342

[56] References Cited

U.S. PATENT DOCUMENTS 2,898,229 8/1959 Herr et al. .
3,122,445 2/1964 Osborn .
3,442,700 5/1969 Yoshioka et al. .
3,666,741 5/1972 Leibecki .

FOREIGN PATENT DOCUMENTS 1151746 5/1969 United Kingdom .

*Primary Examiner*—Bernard Lipman
*Attorney, Agent, or Firm*—Kerkam, Stowell, Kondracki & Clarke

[57] ABSTRACT

A method for the modification of the surface of polytetrafluoroethylene or of copolymers consisting mainly of polytetrafluoroethylene by the action of fluorides of silicone, germanium, phosphorus or arsenic on the surface of the copolymer which is heated to at least 150° C. in the presence of moisture or by the subsequent action of water or steam. The fluorides used penetrate into the polymer to be modified and form a polymeric, tightly adhering network during hydrolysis.

21 Claims, No Drawings

METHOD FOR THE MODIFICATION OF THE SURFACES OF POLYTETRAFLUOROETHYLENE, MODIFIED MOLDED ELEMENTS BASED ON POLYTETRAFLUOROETHYLENE, AND USE OF THE SAME

The invention relates to a method for the modification of the surface of polytetrafluoroethylene or of copolymers consisting mainly of polytetrafluoroethylene by the action of a volatile and easily hydrolyzable compound on the one heated surface of the polymer and of moisture, as well as to molded elements thus modified and their use.

Polytetrafluoroethylene and copolymers containing it in preponderant amounts are especially used for the manufacture of molded elements, for example for coating of metals, because of their excellent mechanical and chemical properties. Polytetrafluoroethylene is to a large degree chemically inert and is not affected by most organic solvents. Only fluorine-containing hydrocarbons will cause polytetrafluoroethylene to swell without, however, destroying it. Especially the adhesion and wetting characteristics of polytetrafluoroethylene do not change after treatment with fluorine hydrocarbons. Decomposition reactions occur if basic fluorine or chlorotrifluoride come into contact with polytetrafluoroethylene at higher temperatures and under pressure. In regard to anorganic fluorides, e.g. uranium hexafluoride, however, polytetrafluoroethylene is completely stable (see Kunststoffhandbuch, "Fluorhaltige Polymerisate" [Handbook of Plastics, "Fluorine-containing Polymers"], Vol. 11, Chapter 4, p. 271, Carl-Hanser Verlag, München).

This chemically inert behavior makes the modification of the surface of polytetrafluoroethylene extraordinarily difficult. However, it is often desirable to make the surfaces of products made of polytetrafluoroethylene hydrophilic and thereby to improve their wettability with polar fluids, such as water. Often the adhesive or adhesive properties in regard to organic coating are sought to be influenced by modification of the surface. This is of special interest when constructing multi-layered combination materials. Further, the ability to accept dye, the anti-static behavior and certain electrical properties, such as surface resistance, are improved or changed by hydrophilation.

It is known to apply to the surfaces of products made of polytetrafluoroethylene hydrophilating substances, such as non-ionogenic wetting agents, cation-active anti-static preparations or anion-active compounds. However, these do not adhere to the surface of the polytetrafluoroethylene and thus can be washed off. But a permanent modification of the surface properties of products made of polytetrafluoroethylene is desired.

It is further known to treat the surface of polytetrafluoroethylene oxidatively by corona discharge or by the effect of a chromic-sulfuric acid mixture. However, such treatment only affects the outer boundary of the surface, is expensive, negatively affects sewage disposal and in general gives little satisfaction. The same is true for treatment with sodium in liquid ammonia or other solvents with the additional disadvantage that the etching effect is reduced by UV radiation and the effects of heat.

A method for the activation of the surface of polymers made of fluorocarbon is described in U.S. Pat. No. 2,898,229. In the course of this method the articles, for example made of polytetrafluoroethylene, are first heated to a surface temperature of approximately 150° C. without the surface of the polymer being materially affected. The heated surface then is brought into contact with the vapor of a volatile and easily hydrolyzable compound of silicon, titanium or germanium in the presence of moisture. Cited in this patent as examples of such volatile and easily hydrolyzable compounds are titanium tetrachloride, germanium tetrachloride and silicon tetrachloride as well as tetraisopropyl titanate. Treatment is preferably with the vapor of the volatile compound.

It is stated in the patent that these compounds react with the moisture present on the surface of the articles with the formation of oxides. The treated articles lose their customary slipperiness. Stickers will adhere to the treated surface in contrast to the untreated surface. Adhesion of epoxy resins to the surface is improved in the same way. A further method for the surface treatment of polytetrafluoroethylenes is known from U.S. Pat. No. 3,666,741. In this method the article made of a fluorocarbon polymer is immersed into a liquid metallic fluoride selected from the group of rhenium hexafluoride and molybdenum hexafluoride. This immersion is continued until the desired penetration has been achieved. The rhenium hexafluoride or the molybdenum hexafluoride is then hydrolyzed. Dark-colored, electrically conductive coatings are the result. Finally, a method for the treatment of molded articles of fluorocarbon polymers is known from U.S. Pat. No. 3,122,445. In this method the articles are treated with boric trifluoride and oxygen to change the surface properties of the polymer. But this is an oxidation process.

The treatment of pure polytetrafluoroethylenes is not possible.

It is possible, with the methods of the state of the art, to so modify the surfaces of molded elements made of polytetrafluoroethylene that their wettability is improved. However, it has been found that in the known methods only a thin layer of the article very close to the surface is affected such that the permanence of the properties which is caused or varied by the modification is inadequate.

It is therefore an object of the invention to find a method which permits to so modify the surface of articles consisting of polytetrafluoroethylene or of copolymers mainly consisting of polytetrafluoroethylene that not only the areas close to the surface of the molded elements are affected, but that the modification of the molded elements is accomplished into deeper areas than has been possible so far. By means of the invention the permanence of the effects achieved is especially improved. In general, the modified surface is free of undesirable changes in coloration.

By means of the invention a modified molded element based on polytetrafluoroethylene or a copolymer thereof is created which has bonded in its layer adjacent to the surface silicic acid in the form of a pseudo-interpenetrating polymer network.

This object is achieved in accordance with the invention by the object of the main claim. Preferred improvements are described in the dependent claims.

Surprisingly, the desired modification succeeds because the fluorides of silicon, germanium, phosphorus or arsenic are used as volatile, easily hydrolyzable compounds. As in the known methods, the fluorides are permitted to act on the articles made from fluorocarbon polymers at temperatures of at least 150° C. preferably, however, a temperature in the range from 250° to 300° C. is selected as reaction temperature. The length of reaction depends on the temperature of the surface at which the reaction takes place. The higher the surface temperature selected, the shorter the reaction time can be. Reaction especially occurs during a reaction time from a few minutes to approximately 2 to 3 hours.

A preferred application of the method of the invention is characterized by the use of silicon tetrafluoride or the fluorides of the highest valence group of the elements germanium, phosphorus or arsenic as fluorides. However, the most preferred of these fluorides is silicon tetrafluoride, since it most easily penetrates the structure of the molded elements made of polytetrafluoroethylene and hydrolyzes into silicic acid together with the steam or liquid water, which forms a polymeric network adhering in a special way to the polytetrafluoroethylene molded element.

The reaction of the water or the steam with the surfaces treated with the fluorides of silicon, germanium, phosphorus or arsenic can take place in one step, i.e. together with the application of the fluorides. However, the treatment with water or steam can also take place following the surface treatment of the molded elements with the fluorides. Therefore a preferred application of the method of the invention consists in permitting the fluorides of silicon, germanium, phosphorus or arsenic to act on the surfaces of the polymers in a first method step and then exposing the polymer so treated to the reaction of water or steam. It has been shown to be especially practical to treat the treated polymer with cold water, especially with water having a temperature below 10° C. It is possible by the use of cooled saline solutions to fix the treatment temperature at values below the freezing point of water. By means of this an especially good fixation of the silicic acid network being formed is achieved in the molded body.

The polytetrafluoroethylene or its copolymers can be present in the form of powders, granulates, foils, fibers, flat fabrics or knits or as molded elements, e.g. as gear wheel, disc, sliding body.

Copolymers in the sense of the present inventions are those with up to 50% by weight of polymerized monomers from the group of hexafluoropropylene, chlorotrifluoroethylene, perfluorovinylether, vinylidene fluoride, vinyl fluoride, ethylene and/or propylene. Especially preferred are copolymers with up to 30% by weight of the above identified monomers.

It is to be assumed that the fluorides of Si, Ge, P and As penetrate into the surface boundary layer of the polytetrafluoroethylene at the selected temperatures and, in the manner of fluorine-containing hydrocarbons, swell the polytetrafluoroethylene and its copolymers. The fluorides hydrolyze under the influence of the steam, forming hydroxyl groups. The silicic acid forming, particularly during hydrolysis of $SiF_4$, exhibits the known property of an enlargement by condensation of the molecules catalyzed by the freed hydrogen fluoride. Thus it is assumed that in the matrix of the surface layer of the swelled polytetrafluoroethylene a polymeric and physically anchored network of polysilicic acid is formed which solidly adheres to and in the polymer. The properties of the polytetrafluoroethylene or its copolymers treated in accordance with the invention as well as physical tests, e.g. by means of the electron spectroscopy for chemical analyses, make it appear probable that the silicic acid is bonded in the manner of a pseudo-interpenetrating polymer network.

The products of the method are modified in the desired way, especially made hydrophilic, by the incorporation of the hydrolysis products and if applicable the condensation products of the fluorides. Among others the following properties can be seen in the products obtained in accordance with the invention: If single fibers, small sections of a foil or powder of untreated polytetrafluoroethylene are placed on tenside-containing water, these materials remain on the surface. The corresponding hydrophilated samples treated according to the invention, however, are immediately wetted and sink to the bottom.

Foils treated according to the invention become transparent. If unmodified polytetrafluoroethylene is treated with disperse dye (e.g. Foronmarineblau S-2 G1) under conditions as used for showing structural differences of polyester fibers (see B. von Falkai, Synthesefasern [Synthetic Fibers], Verlag Chemie, Weinheim 1982, p. 418), its surface is superficially stained. In contrast thereto, the corresponding hydrophilated samples hardly take on any disperse dye at all.

The method of the invention is especially advantageous in comparison to the method of U.S. Pat. No. 2,898,229, because the fluorides of silicon, germanium, phosphorus or arsenic selected in the present invention penetrate considerably deeper into the surface layer of the molded elements made of polytetrafluoroethylene to be modified. Silicon tetrachloride or germanium tetrachloride exhibit an unsatisfactory penetration depth. The hydrolysis products created by the penetration of water are mainly bonded to the outer surface and therefore can be easily removed by mechanical action. In contrast thereto the fluorides of silicon, germanium, phosphorus or arsenic penetrate the molded element to be modified to a considerably greater depth. During hydrolysis the polymeric network of the hydrolysis products being created anchors itself especially effectively in the matrix of the molded element and therefore is considerably more capable of resistance mechanically. This deeper penetration depth can be shown in a simple manner by successively removing layers of the surface of a molded element treated according to the invention with the use of a microtome and by testing the wettability of the remaining surface by means of inks with predetermined surface tension. It will be shown that molded elements treated according to the invention are penetrated to a considerably higher degree than the molded elements treated in accordance with the state of the art, especially the method of U.S. Pat. No. 2,898,229.

When testing the surface of molded elements manufactured in accordance with the method of the invention it can be shown by means of spectroscopic analysis methods that silicon and oxygen atoms are disposed on the surface. If molded elements made of polytetrafluoroethylene having a pore structure are modified by the method of the invention, it can be proven by scanning electron microscope pictures that the pore structure of the treated molded elements remains intact. No sealing of the pores by silicic acid formed during hydrolysis takes place. If products obtained by the method of the invention are subjected to hot water it can be seen that the properties of the modified molded elements remain intact in spite of the hot water treatment, i.e. that the permanence of the effects obtained is great. The polymeric acids created by hydrolysis are therefore not only physically incorporated into the article, but are also bonded to the inner and outer surface of the article.

The following uses are therefore preferable for the products obtained according to the invention: Molded elements modified in accordance with the invention can, because of their self-lubricating properties, be used as mechanical structural elements, e.g. in mini motors, but also for the creation of self-lubricating closure elements. The lubricating properties are also maintained in a high vacuum. Asymmetric membranes can be formed from unilaterally hydrophilated foils. The products of the method in the form of fibers can be worked into a fabric with a hydrophilic surface, e.g. for filter cloth. The products of the method can be subjected to further modification reactions because of their hydroxyl groups located on the surface.

The surfaces of treated molded elements or foils can be glued in a simple manner with the aid of customary glues with organic resins, e.g. with the formation of laminated structures. Especially suitable are glues on the basis of isocyanates, which can interchangeably act with the hydroxyl groups located on the surfaces of the polymers treated in accordance with the invention.

The method of the invention as well as the properties of the products manufactured according to the method are further described in the following examples.

EXAMPLE 1

A V4A steel cylinder (diameter at the bottom 30 cm, diameter at the upper opening: 10 cm, height: 50 cm) is provided with clamping jaws at the upper opening, into which a cylindrical workpiece of polytetrafluoroethylene can be clamped.

In the bottom of the cylinder is a mixture of pulverized calcium fluoride and quartz sand onto which is dripped concentrated sulfuric acid from a dosing device. Steam can be blown into the cylinder through an inlet.

The sulfuric acid is measured such that the load per area unit by the gas being created lies between 5 and 500 m/m$^2$ h. The temperature of the workpiece is kept at 250° to 260° C. during the treatment with silicon tetrafluoride. The workpiece is cooled to a temperature of $-10°$ to 0° C. for the subsequent application of steam. If silicon tetrafluoride and steam are used simultaneously, the amount of water in the gas chamber is set to a value between 6 and 60 g/m. Again, a value between 5 and 500 m$^2$ is selected for the load per area unit. The reaction times of SiF$_4$ and/or water can vary between several minutes and several hours.

As shown by the electron spectroscopy for chemical analysis, silicon and oxygen atoms are present on the surface of a workpiece thus treated.

Commercially available polyethylene test inks with graduated surface tension, as used for the determination of the pre-treatment degree of foil surfaces (Manufactured for instance by Druckfarbenfabrik Gebr. Schmidt GmbH, 6000 Frankfurt 96), are applied. A solid film on the treated material is obtained with all tests inks in the range of 30 to 50 nN/m.

A drop of an aqueous tenside solution (1% of a wetting agent on the basis of sulfonite of sodium) immediately spreads on the surface.

Foils are peeled off the workpiece, having a varying thickness of 0.02 mm and 1 mm.

The tests described above (electron spectroscopy for chemical analysis, coating with polyethylene inks, wetting with aqueous tenside solution) are repeated with these foils with the same result.

As described by B. von Falkai in Synthesefasern [Synthetic Fibers], Verlag Chemie, Weinheim 1981, p. 418, the foils are tinted with a disperse dye, commercially obtainable under the name Foronmarineblau S-2 G1. The untreated foils are distinctly more strongly colored than the treated ones. When soaping with an anionic detergent and boiling, the treated foils lose their coloring material completely: in contrast thereto the coloring material remains for the better part in the untreated foils.

A small foil piece with an area of 1 cm$^2$ is placed on a tenside solution (1% of a wetting agent on the basis of sulfonite of sodium). While the untreated polytetrafluoroethylene samples remain on the surface, the samples treated in accordance with the invention immediately sink because of their adequate wetting.

A white, porous foil (pore volume 40%, thickness: 0.25 mm) is dipped into an aqueous tenside solution (1% of a commercially available detergent). The foil becomes transparent immediately after immersion.

Polytetrafluoroethylene samples treated according to the invention as well as untreated samples exhibit identical DSC spectra during renewed heating after heating above melting temperature and cooling to room temperature.

Maximum tensile load and maximum tensile expansion are determined for the foils of the treated and untreated foils. While the maximum tensile expansion of the material treated in accordance with the invention may be reduced to approximately 60% (comparatively) of the untreated material, the maximum tensile load after treatment is still at least 80% of the starting material.

EXAMPLE 2

Foils of a thickness between 0.02 and 1 mm, which are drawn or not drawn, are clamped into the clamping jaws of the steel cylinder described in Example 1. Then the foils are treated as described in Example 1. The foils exhibit properties as described in Example 1.

EXAMPLE 3

In the steel cylinder described in Example 1 the clamping jaws are exchanged for a fine-mesh steel gauze. Fiber material of different types (flock, endless fibers, spun fiber and filament yarns, fabrics, felt) is deposited on this gauze. As required, the material is pressed together from the opposite side by a second steel gauze. Then the materials are treated as described in Example 1. The fiber materials exhibit properties after treatment as described in Example 1 in connection with foils.

EXAMPLE 4

A suction filter made of V4A steel is inserted into the opening of the steel cylinder described in Example 1 (diameter: 9.5 cm, height: 5 cm; perforated part: 20%), which is filled to a height of 1.5 cm with polytetrafluoroethylene powder. The powder is treated analog to Example 1 with silicon tetrafluoride. The powder exhibits properties after treatment as described in Example 1.

EXAMPLE 5

The tests described in Examples 1 to 4 are repeated. However, instead of silicon tetrafluoride, gaseous germanium tetrafluoride, phosphorus pentafluoride or arsenic pentafluoride is used. The gases are directly injected into the steel cylinder from a pressure vessel. Otherwise the conditions (temperature at the input side of the molded elements, load per area unit by the injected gas) are selected the same as described in Examples 1 to 4. The modification of the polymer surface which occurs is proven in the same way as in Examples 1 to 4. All tests exhibit a polar, hydrophilated surface. They are easily wettable by polar fluids such as water or alcohol.

EXAMPLE 6

A workpiece is inserted into a V4A autoclave (volume 1.7 l). A pressure of 1 atü is created in the autoclave by blowing in of silicon tetrafluoride. Then the autoclave is brought to 250° C., because of which the pressure increases to 2.2 to 2.4 atu. After several hours of reaction the autoclave is quickly cooled to 0° C. with an ice/salt solution. Ice/salt solution having a temperature of −15° C. is inserted into the autoclave from below under pressure and left to react for a time between 1 min and 1 h.

The tests described in Example 1 are repeated with the same result.

EXAMPLE 7

The test described in Example 6 is repeated. However, a treatment temperature of 330° C. is selected and besides silicon tetrafluoride, silicon tetrachloride in the same molar concentration is used in a parallel test.

The tests for the characterization of the material described in Example 1 are repeated with the same result.

To determine the penetration depth of the silicic acid, the surface is removed from both samples in layers by means of a microtome. Tests are made at the correspondingly newly created surfaces with polyethylene test ink to determine whether the hydrophilating effect of the silicic acid can still be proven. In the case of the sample treated with $SiCl_4$ this is the case up to a value of >1 mm. In the sample treated with $SiF_4$ no hydrophilating effect can be shown at values of <0.1 mm.

We claim:

1. A method for modifying the surface of an article comprising polytetrafluoroethylene or a copolymer of tetrafluoroethylene comprising heating the surface and treating the heated surface with a volatile and easily hydrolyzable compound and with moisture, wherein the volatile and easily hydrolyzable compound comprises a fluoride of silicon, germanium, phosphorus or arsenic or a mixture thereof.

2. A method in accordance with claim 1, wherein the fluoride is $SiF_4$, $GeF_4$, $PF_5$ or $AsF_5$.

3. A method in accordance with claim 1, wherein in a first method step the fluorides of silicon, germanium, phosphorus or arsenic are permitted to act on the surface and wherein the surface thus treated is exposed to the action of water or stream in a second method step.

4. A method in accordance with claim 3, wherein the treated surface is treated with water of a temperature below 10° C.

5. A method in accordance with claim 1, wherein said treatment comprises a first method step wherein the fluorides of silicon, germanium, phosphorus or arsenic are permitted to act on the surface and in a second step, the surface thus treated is treated by cooled saline solutions which are cooled below the freezing point of water.

6. A method in accordance with claim 2, wherein the treatment with fluorides of silicon, germanium, phosphorus or arsenic takes place simultaneously with treatment with water or steam.

7. A method in accordance with claim 1, wherein the heating of the surface consists of heating to a temperature of at least 150° C., while the fluorides act on it.

8. A method in accordance with claim 2, wherein in a first method step the fluorides of silicon, germanium, phosphorus or arsenic are permitted to act on the surface and wherein the surface thus treated is exposed to the action of water or steam in a second method step.

9. A method in accordance with claim 8, wherein the treated surface is treated with water of a temperature below 10° C.

10. A method in accordance with claim 2, wherein said treatment comprises a first method step wherein the fluorides of silicon, germanium, phosphorus or arsenic are permitted to act to the surface and in a second step, the surface thus treated is treated by cooled saline solutions which are cooled below the freezing point of water.

11. A method in accordance with claim 3, wherein the second method step comprises treating the surface thus treated in said first method step by cooled saline solutions which are cooled below the freezing point of water.

12. A method in accordance with claim 8, wherein said second method step comprises treating the surface thus treated in said first method step by cooled saline solutions which are cooled below the freezing point of water.

13. A method in accordance with claim 2, wherein the heating of the surface consists of heating to a temperature of at least 150° C., while the fluorides act on it.

14. A method in accordance with claim 3, wherein heating of the surface to a temperature of at least 150° C., while the fluorides act on it.

15. A method in accordance with claim 8, wherein heating of the surface to a temperature of at least 150° C., while the fluorides act on it.

16. A method in accordance with claim 6, wherein heating of the surface to a temperature of at least 150° C., while the fluorides act on it.

17. A method in accordance with claim 7, wherein said surface is heated to a temperature of 250° to 300° C. while the fluorides act on it.

18. A method in accordance with claim 13, wherein said surface is heated to a temperature of 250° to 300° C. while the fluorides act on it.

19. A method in accordance with claim 14, wherein said surface is heated to a temperature of 250° to 300° C. while the fluorides act on it.

20. A method in accordance with claim 15, wherein said surface is heated to a temperature of 250° to 300° C. while the fluorides act on it.

21. A method in accordance with claim 16, wherein said surface is heated to a temperature of 250° to 300° C. while the fluorides act on it.

* * * * *

UNITED STATES PATENT AND TRADEMARK OFFICE
CERTIFICATE OF CORRECTION

PATENT NO. : 4,975,495

DATED : December 4, 1990

INVENTOR(S) : Volker ROSSBACH, ET AL

It is certified that error appears in the above-identified patent and that said Letters Patent is hereby corrected as shown below:

In column 7, claim 3, line 57: delete "stream" and insert --steam--.

Signed and Sealed this

Fifth Day of May, 1992

Attest:

DOUGLAS B. COMER

*Attesting Officer*  *Acting Commissioner of Patents and Trademarks*